United States Patent
Barwick

(10) Patent No.: US 9,658,877 B2
(45) Date of Patent: May 23, 2017

(54) CONTEXT SWITCHING USING A CONTEXT CONTROLLER AND ON-CHIP CONTEXT CACHE

(75) Inventor: James Barwick, Singapore (SG)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 881 days.

(21) Appl. No.: 13/003,222

(22) PCT Filed: Aug. 23, 2010

(86) PCT No.: PCT/SG2010/000305
§ 371 (c)(1),
(2), (4) Date: Jan. 7, 2011

(87) PCT Pub. No.: WO2012/026877
PCT Pub. Date: Mar. 1, 2012

(65) Prior Publication Data
US 2012/0047516 A1    Feb. 23, 2012

(51) Int. Cl.
*G06F 9/46*    (2006.01)
(52) U.S. Cl.
CPC .................. *G06F 9/461* (2013.01)
(58) Field of Classification Search
CPC ....................................................... G06F 9/461
USPC .................................. 712/228, 108; 718/108
See application file for complete search history.

(56) References Cited

U.S. PATENT DOCUMENTS

| | | | |
|---|---|---|---|
| 5,249,231 A * | 9/1993 | Covey et al. | 711/163 |
| 5,379,428 A * | 1/1995 | Belo | G06F 8/451 |
| | | | 711/173 |
| 5,787,490 A * | 7/1998 | Ozawa | 711/173 |
| 6,430,667 B1 | 8/2002 | Loen | |
| 7,055,004 B2 | 5/2006 | DeMent et al. | |
| 7,076,609 B2 | 7/2006 | Garg et al. | |
| 7,590,774 B2 | 9/2009 | Johns et al. | |
| 7,636,829 B2 | 12/2009 | Hertzberg et al. | |
| 2004/0117589 A1* | 6/2004 | Arimilli et al. | 711/203 |
| 2004/0162971 A1 | 8/2004 | Joy et al. | |
| 2004/0215898 A1 | 10/2004 | Arimilli et al. | |
| 2005/0102565 A1 | 5/2005 | Barr et al. | |
| 2006/0018684 A1 | 1/2006 | Shimazaki | |
| 2007/0022428 A1* | 1/2007 | Yamasaki | 718/108 |
| 2007/0174597 A1* | 7/2007 | Joy et al. | 712/228 |

(Continued)

FOREIGN PATENT DOCUMENTS

WO    WO2006/124750    11/2006

OTHER PUBLICATIONS

Kiyofumi Tanaka, Fast Context Switching by Hierarchical Task Allocation and Reconfigurable Cache, Jul. 17, 2003, Proceedings of the Innovative Architecture for Future Generation High-Performance and Systems, 10 pages.*

(Continued)

*Primary Examiner* — Andrew Caldwell
*Assistant Examiner* — Jyoti Mehta
(74) *Attorney, Agent, or Firm* — Dorsey & Whitney LLP

(57) ABSTRACT

The disclosure relates generally to techniques, methods and apparatus for controlling context switching at a central processing unit. Alternatively, methods and apparatus are provided for providing security to memory blocks. Alternatively, methods and apparatus are provided for enabling transactional processing using a multi-core device.

16 Claims, 6 Drawing Sheets

(56) References Cited

U.S. PATENT DOCUMENTS

2007/0204268 A1  8/2007  Drepper
2008/0040524 A1  2/2008  Zimmer et al.

OTHER PUBLICATIONS

Hennessy and Patterson, Computer Architecture a Quantitative Approach, 1996, Morgan Kaufmann, 2nd edition, pp. 40-41.*
Memory Protection, Jul. 11, 2009, Wikipedia, pp. 1-5.*
Barbic, Multi-core architectures, May 3 2007, 67 pages, [retrieved from the internet on Jun. 10, 2015], retrieved from URL <http://www.cs.cmu.edu/~fp/courses/15213-s07/lectures/27-multicore.pdf>.*
Spruth, System z and z/Os unique characteristics, Apr. 8, 2010, Version 1.0, 55 pages, [retrieved from the internet on Jun. 10, 2015], retrieved from URL <https://publikationen.uni-tuebingen.de/xmlui/bitstream/handle/10900/49392/pdf/report_spruth_2010.pdf?sequence=1&isAllowed=y>.*
Patent Cooperation Treaty Application No. PCT/SG2010/000305: International Search Report and Written Opinion dated Nov. 23, 2010, 12 pages.

* cited by examiner

CONTEXT SWITCHING USING A CONTEXT CONTROLLER AND ON-CHIP CONTEXT CACHE

CROSS-REFERENCE TO RELATED APPLICATION

This application is the U.S. National Stage filing under 35 U.S.C. §371 of International Application No. PCT/SG2010/000305, filed Aug. 23, 2010, the disclosure of which is incorporated herein by reference in its entirety.

BACKGROUND

Due to limits of how fast a central processing unit (CPU) can be clocked, and limits of how small and fast circuits and transistors can be made, the industry has turned to process optimization and parallel computing in order to increase the performance of computing platforms. This has introduced the concepts of multi-core and many-core processors.

Multi-Core processors in both homogeneous and heterogeneous models are being developed. A basic problem with multi-core and many-core processors is the issue with operating system scalability. Operating systems today need to keep track of the number of available CPU cores and to schedule processes and threads on each of those cores. This is a time-consuming operation for operating systems as the operating system must swap processes by saving of a state and loading a new state and context into the CPU before the operating system gives the CPU an instruction to execute process.

SUMMARY

In some embodiments, a processor includes multiple cores configured on a single die to execute a multiple instructions; and a context switch controller configured on the single die to control the execution of instructions on each of the multiple cores.

In some embodiments, a method for performing process switching includes receiving a command including a Process ID identifying a process to execute at a context controller configured on a central processing unit; accessing the process based on the Process ID in a memory on the central processing unit; and scheduling the accessed process to execute on one of a multiple number of cores on the central processing unit.

In some embodiments, a method for securing a memory block includes identifying a memory block to access; generating an access mask for the memory block; and tagging the memory block with process identification information and the generated mask.

In some embodiments, an apparatus for enabling transactional processing using a multi-core device includes a central processing unit (CPU) having a multiple number of cores; a memory bus controller coupled to the CPU over a processor-side bus; a main memory core coupled to the memory bus controller over a first memory-side bus; and a transaction memory core coupled to the memory bus controller over a second memory-side bus, wherein the CPU directs the flow of data over a memory bus selected by the memory controller as the first and/or second memory side bus based upon the value of a switch provided to the memory bus controller.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
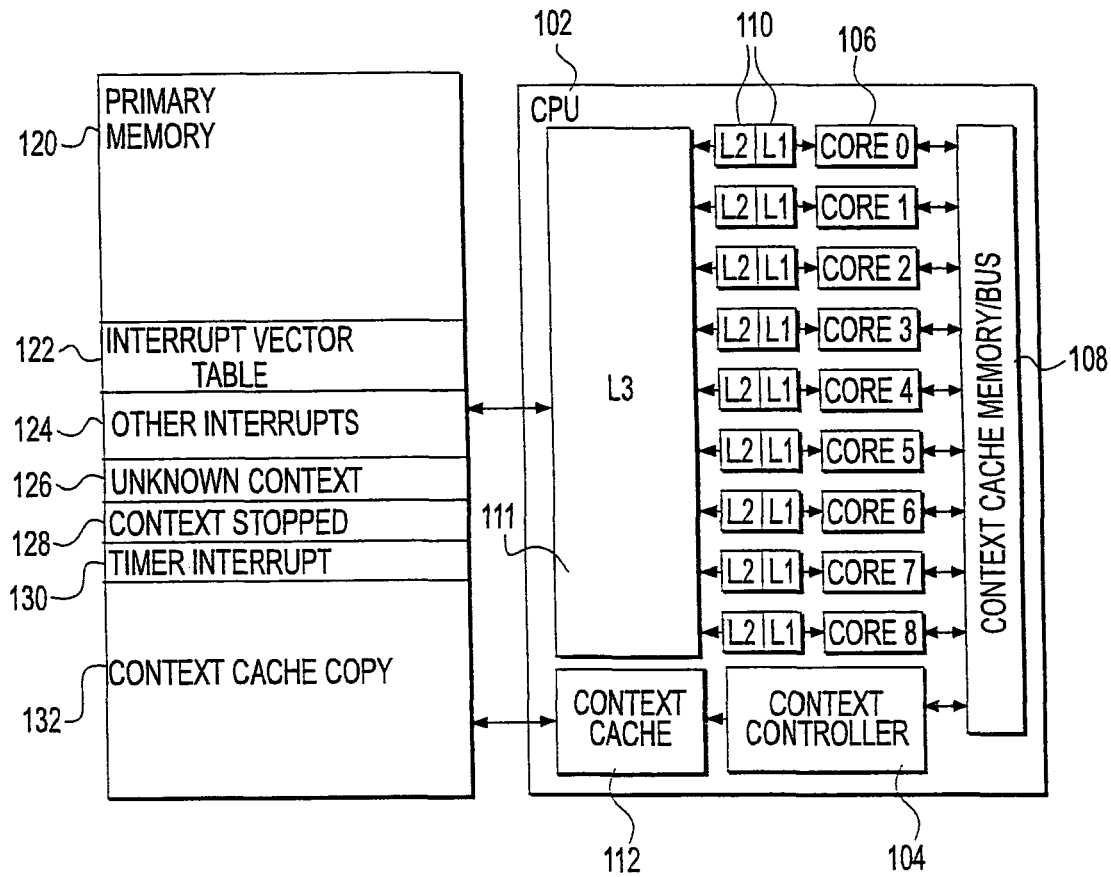
FIG. 1 is an example configuration of a central processing unit, in accordance with some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alfa, to methods, apparatuses, computer programs and systems related to a process management component configured to eliminate or reduce the time it takes to switch from one process to another, thereby improving parallelism. The process management component may be implemented as a hardware level component that performs context switching. A context may be a memory state associated with a process including but not limited to CPU registers for data segments, stack segments, extended segments, code segments, immediate registers, or any other relevant CPU register contained within the CPU or register contained within any I/O Controller. The hardware component, e.g., the context controller, may be configured on the CPU. The CPU, configured on a single die (or multiple die within a CPU substrate. It must be noted that within this disclosure the term 'die' or 'single die' is not meant to literally identify a single manufactured circuit. It is meant to broadly describe a CPU package that could contain one or more discrete processing circuits or cores. The term 'substrate' which also broadly describes a CPU package containing multiple processing units can be substituted in this disclosure for the term 'die' or 'single die'), may include a context controller and a plurality of processing cores. Thus, the context controller does not have to wait for memory bandwidth access and does not have to wait for an actual CPU core to become available in order to access and retrieve data stored in primary memory regarding the state of the context to execute. A context may be swapped into or out of an executing state by the context controller on the CPU without the need to access primary memory for context data. The context controller has the information necessary for performing a context switch in local cache memory on the CPU die.

This disclosure is further drawn, inter alia, to techniques for providing for Process ID visibility to the hardware, wherein memory blocks are configured with a tag including the Process IDs within virtual memory map structures, thereby providing a level of security.

This disclosure is further drawn, inter alia, to providing a configuration including two memory cores for providing redundant memory in the event of, e.g., a failure of a transaction process.

Core Architecture

FIG. 1 depicts an example diagram of a CPU and Primary Memory, consistent with the principles of some embodiments of the present disclosure. As can be seen in FIG. 1, a CPU 102 includes a context controller 104, cores 0-8 106, a context cache memory/bus 108, and L1 and L2 caches 110 and an L3 cache 111. It may be appreciated that while only cores 0-8 are depicted, additional cores may be configured in CPU 102. Each of cores 0-8 106 is coupled to their respective L1 and L2 caches 110. Each of L2 caches 110 are coupled to L3 cache 111. L3 cache 111 is communicably linked to a primary memory 120. CPU 102 may be implemented on a single die, e.g., a single integrated circuit.

Each of cores 0-8 106 are communicably linked to context controller 104 and each are independently configured to execute processes or instructions according to a particular instruction set architecture at the command of context controller 104.

Context controller 104 is configured within the overall die structure of CPU 102. Context controller 104 is configured to receive, e.g., pull, context details from primary memory 120 if the process context is not available in local cache at the instruction of the operating system for execution and primary memory 120 includes a memory block for storing information regarding the running processes.

Context cache memory/bus 108 enables context controller 104 to interact directly with each core 106 thereby to move a process in and out of each core. Cache memory stores context for processes, including process definitions, which are defined by operating system and/or virtual machines. These processes and definitions can be also stored in context cache 112. It may be appreciated that there may be more contexts defined by the operating system that could be stored in context cache 112 on the die. Therefore, the context switch might have to go to primary memory if the context is not available on the die.

A primary memory 120 may include an interrupt vector table 122, other interrupts 124, an unknown context 126, context details 128 including spillover from context cache 112, a timer interrupt 130, and a context cache copy 132. As may be appreciated by one skilled in the art, primary memory stores a context definition map that defines information for running processes and provides access to the map by the context controller 104 when context swapping is performed.

As noted above, cache memory stores process definitions on the core. When the cache fills up, the process definitions are then stored in primary memory. During a context switch, if the context switch cannot locate the Process ID in cache, an unknown context interrupt 126 is provided to the operating system such that the operating system can inform the context controller of the context map location within primary memory. Context controller 104 has direct access to the defined processes that are running or not running within the context cache 112. Context controller 104 interacts directly with primary memory pulling new contexts as defined by the operating system. The context controller may typically throw "Unknown Context" and "Context Stopped" interrupts such that the operating system knows when the context is not defined within cache or does not exists. The contexts may be identified by Process ID (including, for example, thread ID and/or virtual machine ID). L1, L2, L3 caches may behave normally as designed by CPU makers such as Intel, e.g., in the new i7 processor. The context switches are done via the context controller and interrupts and off-die access occur only if necessary.

By providing the configuration as depicted in FIG. 1, the need for the operating system to manage each of the cores on the CPU is eliminated. The functionality of the operation of the operating system is therefore more simplified in management of processes and allows hardware to scale as needed.

In accordance with the core architecture, processor virtualization may be achieved by removing visibility of the number of CPU cores from the operating system. The operating system may only realize the context controller, thereby freeing up the operating system to concentrate on process prioritization, process queuing and memory management.

The context controller may cache executing and stand-by process contexts on die and execute processes based on process priority queuing on any available thread queue or core. This would allow the processes to execute without the need for the operating system to time slice processes. Process execution and context switch would be automatic by priority and controlled by the context switch for the processes to which the context switch is made aware.

The operating system may then track only executing processes and issue priority execution commands to the context controller. The context controller may swap context register memory as needed to any available core.

Process Switching

Current Process Context Switching begins with the operating system setting up a context block in main memory containing a segment for CPU register maps and virtual memory maps in n-way associative arrays.

The HPCS (High Performance Context Switch) approach, as executed by the context controller discussed herein, is to cache CPU contexts by Process ID in an on-die cache such that the operating system need not perform high latency switching.

1. Process Switching with Symmetric Multi Processing (SMP)

A real-time clock interrupt occurs periodically (called a time-slice) switching process execution away from a running process back to the operating system such that the operating system can then determine if a process needs to be executed. This is called "pre-emptive multi-tasking". The CPU saves the current register set on a "stack" in main memory automatically when the interrupt occurs.

The operating system may then determine which core and which process to execute next. It may find a core, interrupt the core, swapping out the current core register map to main memory, setup a new register set on main memory, adjust registers saved on the "stack" if needed, and then perform an IRET (return form interrupt) which may move CPU registers back from main memory to the CPU thread queue.

The real-time clock may interrupt again, and the process repeats.

2. Process Switching with High Performance Context Switch (HPCS)

A real-time clock interrupt occurs periodically switching the execution away from a running process back to the operating system.

Figure 2:
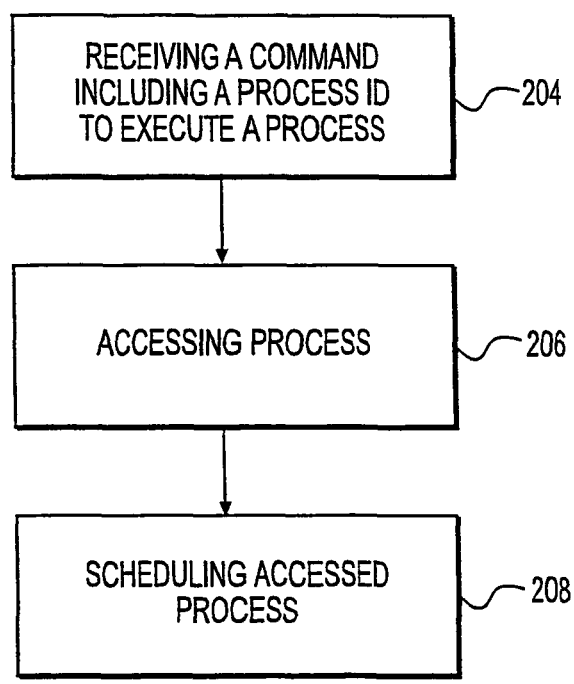
FIG. 2 depicts an example flow diagram of a method for scheduling a process in accordance with some embodiments of the present disclosure.

FIG. 2 depicts an example flow diagram of a method for scheduling a process in accordance with some embodiments of the present disclosure. The depicted example flow diagram may be performed by the context controller in receiving and assigning processes for execution at the central processing unit.

The operating system may determine which Process ID may be executed on the CPU in the next time-slice. The operating system may then issue a SCTX (new CPU instruction) command to the context controller at the CPU identifying the Process ID to execute. The context controller receives the command (block 204). The context controller at the CPU, based on, for example, the received Process ID may determine if the context controller knows of the process by determining whether the process is stored in memory at the CPU. If the process is stored in cache memory at the CPU, the context controller may access the process (block 206). Then the context controller may schedule or queue the Process ID to an available CPU core with context information from its cached pool of contexts (block 208).

If the context controller does not know the process, it may generate an "Unknown Process Interrupt" in which case, modified approach to conventional context switching can be executed which simply identifies the memory block containing the context register set to the CPU's context controller which will transfer the context to cache and schedule the Process ID for execution.

The CPU's context controller will cache the register set in an internal buffer (not depicted) on the die. The IRET commands (return from interrupt) moves the "stack" set from conventional memory back to the CPU completing the "unknown context interrupt".

If the core is "full" (meaning there are no more process slots), the CPU may issue a "Process Interrupted" interrupt that may notify the Operating System a process was stopped and placed in a wait queue when the SCTX command was executed. If the cache is full and there are no more wait queue slots, a "Process Swap Interrupt" may occur and the operating system may be notified to save the current context. This is done by identifying to the CPU's context controller the memory block in which to save the context to be swapped off die.

The CPU may continue to store the interrupted process context. Therefore, it may not need to be "swapped in/out" if a process is interrupted. The operating system may keep track that the process is in the "wait state". The operating system may issue an "execute now" (SCTX) command during a time-slice for a wait-queue process to change into a run state. If a process is in wait state, no register swapping from main memory is necessary.

Each process may be given a priority indicator that the context controller may use when determining on which process to execute a "Process Interrupted" interrupt when the core is full. Based on mode and priority, the context controller may execute the process contexts stored in cache in order. The operating system would need to force a cache swap as needed by listening to the process switch interrupts and timer interrupts and communicating process changes to the context controller as required.

The real-time clock may interrupt again, and the process repeats.

By implementing the above process, the operating system does not need to determine which core to execute on. The operating system may never interrupt a core directly. Thus, latency and system throughput has an opposite reaction as the number of cores increase in the CPU. While conventional SMP throughput falls as the number of CPU cores increase, utilizing HPCS improves throughput as the number of cores increase.

The operating system may maintain control over processing priority. The operating system instructs the context controller what Process ID it needs to execute. Operating system tells the context controller which process it wants to run and then the context controller moves process into a CPU core.

The hardware accesses information stored about where the process is in order to perform context switching. Given a Process ID, the context controller knows where to find the information to perform a context switch based on a memory map base address provided to the context switch by the operating system. Context controller manages memory and non-dedicated cores and has information regarding the running processes.

Each process has a priority. When another process is to be executed, the context controller determines which process can be swapped out. Tables showing what processes are running and on what cores are maintained. The table may be stored in a dedicated memory buffer and may store information regarding whether a process is running or not, what the process's priority is, etc. Thus, all of the instructions necessary to move a process on and off a core are handled by hardware at the context controller.

Given the above configuration, the operating system does not have to move the actual processor CPU instructions into and out of main memory. The process information needed to run is on the CPU itself. Therefore, context switching latency is reduced by the number of CPU cycles that used to be required to go and get the information when the information was not on the die itself. Furthermore, the context switch may automatically cycle through a cache of known contexts without involving the operating system except when the operating system wishes to interrupt the cycle. This is called auto-context switching.

Security

As more and more concurrent processes and virtual machines are created in shared environments, such as computing clouds, steps need be taken to provide data security. As hardware can difficult or impossible to programmatically change, providing security at the hardware level is for one of the most attractive options to provide a secure computing environment.

The principles consistent with some embodiments of the present disclosure provide for Process ID visibility to the hardware, wherein memory blocks are configured with virtual memory maps including the Process ID which contain security bits, thereby providing a level of security at the hardware level which is more secure than at the software level.

With the combination of a Process ID tag and an access mask, memory blocks in user space can be tagged as secure and visible to a process mask such that blocks can be shared among processes and still remain secure. By providing a combination of the Process ID tag and an access mask, shared computing services, such as computing clouds, can avoid the possibility of memory access by unauthorized sources. The principles consistent with some embodiments of the present disclosure may be applied to any system that may require security at the hardware level. To accomplish this, security is abstracted away from the operating system and applied at the hardware level.

Security models inside today's CPUs provide 4 levels of security: Level 0—Kernel Space, Level 1—Device Drivers, Level 2—Device Drivers, Level 3—User Space. These four levels of security give the operating systems (at kernel space) the ability to provide data and memory access security across virtual user space and device drivers. Additional steps can be taken in order to provide process level security in User Space at the hardware level. This disclosure differs from popular "segmentation" techniques currently used within the industry. Segmentation does not prevent the Level 0 kernel space drivers from accessing a protected memory block. The concepts within this disclosure differ from "segmentation" and identify techniques of securing memory at the hardware level such that even Kernel Level processes could not access the protected memory blocks.

The model according to some embodiments of the present disclosure provide for Data Security. An alternative embodiment may utilize the High Performance Context Switch (HPCS) or context controller as discussed above and addresses security at the Process level in User Space. When the operating system builds a thread context, it may provide a data access mask to the process that is stored within the process context. According to one embodiment, this may be managed by the HPCS.

Figure 3:
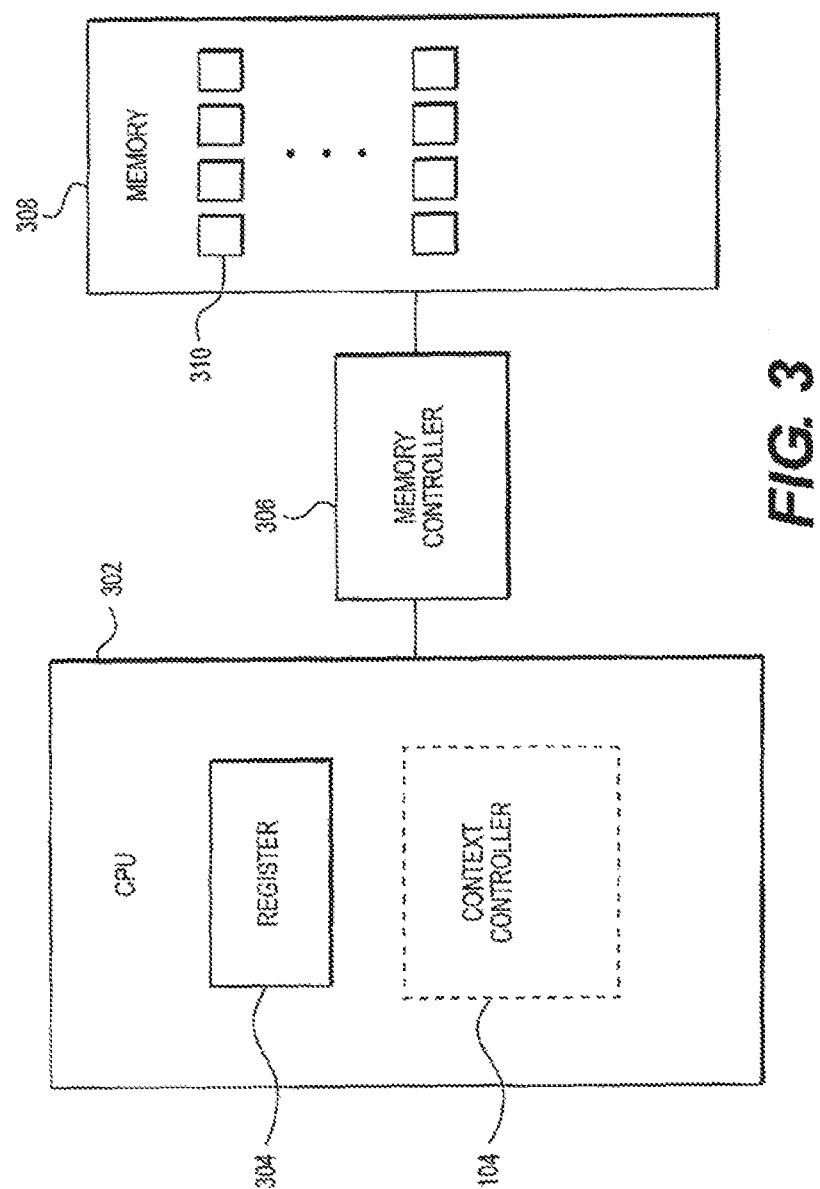
FIG. 3 depicts an example configuration of a CPU and memory, in accordance with some embodiments of the present disclosure.

FIG. 3 depicts an example configuration of the components consistent with the principles of some embodiments of the present disclosure. FIG. 3 includes a CPU 302. It may be appreciated that CPU 302 may be implemented as a conventional CPU. Alternatively, CPU 302 may be implemented with context controller 102, as discussed in the context of FIG. 1. CPU 302 may include a register 304. CPU 302 is communicably linked to a memory controller 306 in order to access a memory 308. Memory 308 includes memory blocks 310. This architecture is similar to, but distinctly different than the current architectures of L3 level caching in today's modern popular CPU's.

Memory blocks 310 may be configured whereby the number of security bits is extended to the process level. The CPU core may be aware of the executing processes and may define that the user process is secure or not.

CPU 302 may include register 304 that includes Process IDs of the processes in context. A memory block may have a tag including security bits, i.e., a mask, and the Process ID.

When reading a memory block, the security bits and/or Process IDs included in the tag may be compared to determine whether data may be returned based on whether Process IDs match. CPU may include an internal running context and memory access logic to do a simple bit comparison to enable the data retrieved from memory. A 64-bit register may be implemented that provides the mapping of processes; and 64 bit register on virtual memory area so CPU can do comparisons to Virtual memory space and actual process context.

Figure 4:
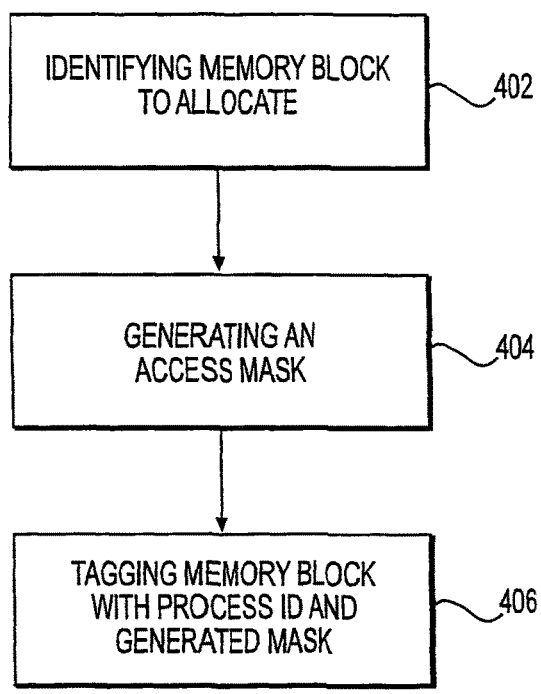
FIG. 4 depicts an example flow diagram of a method for tagging a memory block, in accordance with some embodiments of the present disclosure.

FIG. 4 depicts an example flow diagram of a method for tagging a memory block, in accordance with some embodiments of the present disclosure. When the operating system allocates a memory block to a process, it selects and identifies a memory block (block 402). The operating system may generate a data access mask (block 404), e.g., a generated secure key, e.g., SSHA, RSA, CRYPT, etc., password. The operating system may tag the memory block with the Process ID and mask (block 406). The tag including the Process ID and the mask is maintained by the CPU's virtual memory map tables. When the process executes, it may also generate its process mask. When the CPU is loading a Virtual Memory Map Page and begins the page read, the ALE (Address Latch Enable) signal from the CPU that indicates when memory has settled and is ready for read may pass through the AND mask of the Process ID context and the memory page context security mask and may remain low throughout the read cycle if the mask does not match.

Memory values returned by the memory read instructions may be all zeros (0's) or ones (1's) if the mask doesn't match. By configuring the mask in this manner, the memory is hidden from the reading process.

If the Mask Values match, then the ALE signal may behave as normal latching memory and transfer memory to and from the requesting process.

Thus, the memory move instructions are executing on request of a process context. Contexts may be stored by the HPCS on die with security mask(s). Security masks are used by the CPU when reading a virtual memory block to determine if the ALE signal should be activated.

At the hardware level, memory map is defined with a set of security rules using 2 bits (i.e., four levels). These rules are placed as information in every virtual memory block and identify processes that can access the memory.

OS creates its own Process IDs. In many cases, it creates thread ID's. When creating a memory map and defining process and execution context, a number is provided to the memory mapping store and to the processes execution context that would match and circuitry inside CPU would note the match and enable access.

In creating Process IDs, the memory I/O controller. (memory controller) can move memory from one block to another. The memory controller may know that the memory movement from one block to another has to be the same, e.g., it may know when it is performing memory movement from main memory to CPU or from memory to memory. The memory controller may know if the "from" and "to" locations are in the same Process ID or in the same security. When executing the actual instruction, the memory controller has access to the virtual memory map store so that when it is executing the memory movement instructions, the memory address space includes the Process ID information. The Process ID information is provided by the dedicated cache area, e.g., a memory map. When accessing memory from main memory to the CPU, the memory controller provides the data back to the CPU controller or not based on the CPU's running context. To enhance performance, it may be possible that the memory controller resides on the same physical CPU along with the CPU die and HPCS circuits.

Thus, a cache area (not shown) is provided that includes a well defined process context definition memory block. Virtual memory maps are well defined. The memory controllers are able to use the data in the virtual memory maps to not only to determine "is the 'to' and 'from' address in protected memory?" but also to extend the bits to 64 bits that check to see if the processes match.

Where the movement is from memory to memory, based on virtual memory maps, the "to" and "from" addresses are determined to be the same security context. Where the movement is from memory to CPU, the CPU may know what the executing context is and whether it is allowed to access data.

It may be appreciated that security context as discussed herein could be implemented in a configuration were the operating system is controlling the context switching. It may be further be appreciated that security context as discussed herein could be implemented in a configuration were the context controller 104 is controlling the context switching.

Memory blocks are allocated by the operating system such that the mapping tables (allocation tables) are made available to the CPU and allocation tables would contain both Process ID's and memory masks. These memory allocation tables are sometimes called Virtual Memory Maps and are of the same structure that exists in today's modern CPU's. The security contexts discussed herein is to describe a mechanism to format well the Process ID's and allocation table entries giving the CPU information necessary to provide security at the hardware level to the CPU and Memory controllers. A typical mapping entry would looks something like the following:

this level. However, in accordance with the principles of some embodiments of the present disclosure, a bridge is provided to enable high performance transactional processing within multi-core and multi-process environments. The system described enhances technologies from the computing industry for multi-core, many-core and multi-die CPU technology including homogeneous and heterogeneous core technologies.

Figure 5:
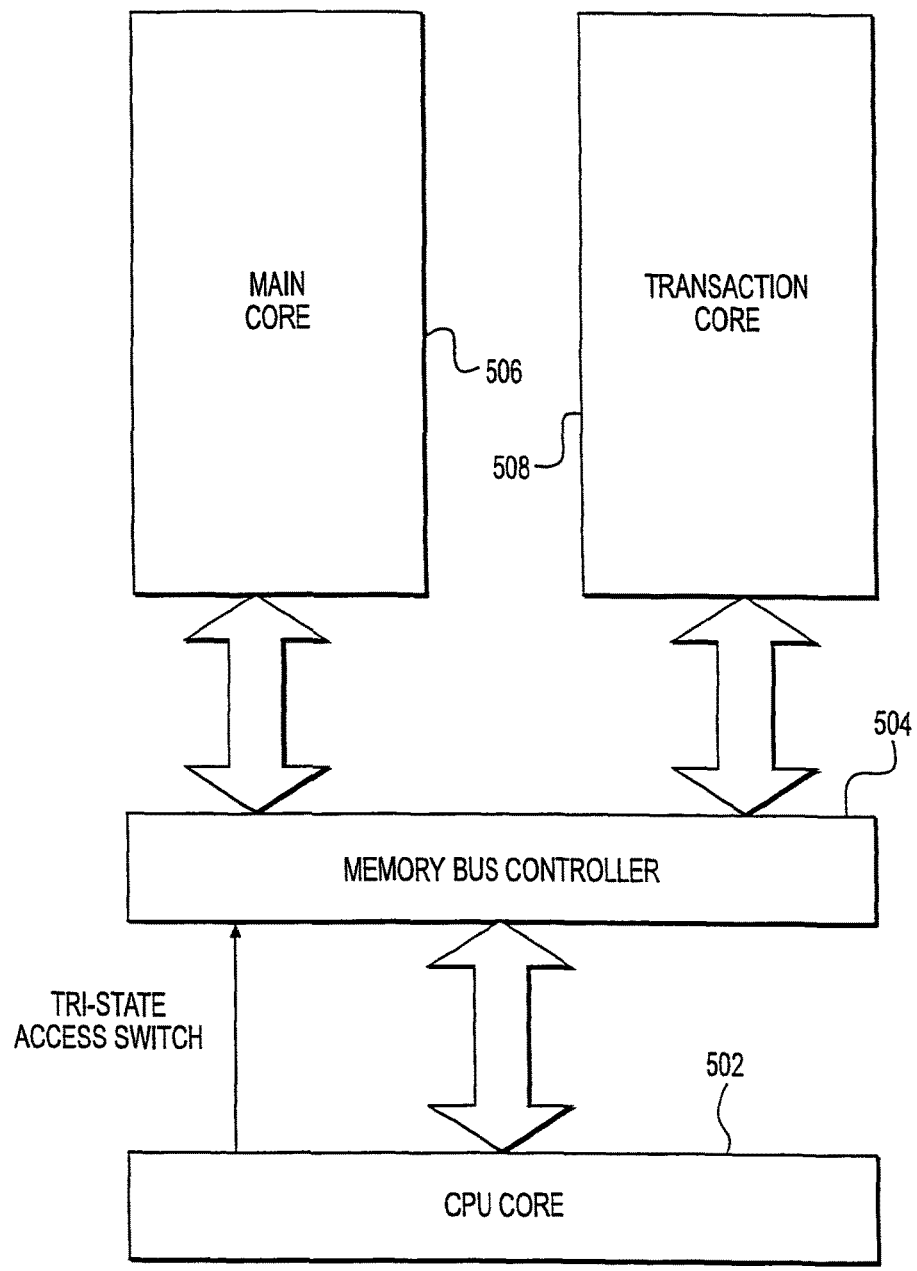
FIG. 5 depicts an example hardware configuration, in accordance with some embodiments of the present disclosure.

FIG. 5 depicts an example block diagram of hardware configuration consistent with the principles of some embodiments of the present disclosure. As shown in FIG. 5, the hardware configuration includes CPU core 502, memory bus controller 504, main core 506 and transaction core 508.

The system provides for a CPU process context enhancement of virtual memory maps, a memory bus to enable memory transactions, a parallel or dual plane memory architecture, and an operating system to perform transactional memory setup and commits.

The primary issue with shared computing services (such as computing clouds) is the introduction of the possibility of memory access by multiple sources. Memory access changes typically "block" a reader such that the reader may wait for updates to complete before reading.

Transactional processes allow readers to continue without blocking. This enables higher processing throughput of parallel processes.

The system may, according to some embodiments of the present disclosure, include the HPCS or context controller as discussed above and may maintain Process ID information for an executing Context within the CPU Core. The "Process" becomes transacted, wherein all memory accessed within the "Process ID" is transacted.

| Memory Allocation Handle | Process ID | Process Mask | Physical Memory |
|---|---|---|---|
| 0x0000 3000 0000 0000 | 0x0100 0000 0000 1234 | 0x1234 5678 9ABC DEF0 | 0x0000 0000 0000 1234 |
| 0x0000 4000 0000 0000 | 0x1100 0000 0000 1234 | 0x1234 5678 9ABC DEF0 | 0x0000 0000 1000 1234 |
| 0x0000 5000 0000 0000 | 0x2100 0000 0000 1234 | 0x1234 5678 9ABC DEF0 | 0x0000 0000 2000 1234 |
| 0x0000 6000 0000 0000 | 0x3100 0000 0000 1234 | 0x1234 5678 9ABC DEF0 | 0x0000 0000 3000 1234 |

The above memory allocation table is identical to today's memory allocation tables and virtual memory map tables used in modern CPU's with the exception of instead of two entries in the table (allocation handle and physical memory address), the virtual memory allocation maps would contain 4 (four) entries which will include the processed and access mask. The Process ID is discussed further in paragraph [0083].

Transactional Memory

As more and more concurrent processes and virtual machines are created in shared environments (such as computing clouds) the issue of memory sharing begins to be a concern.

A "transaction" may be an event in which one process can update and change data while other processes read from a prior version of that data. When the one process commits or saves its changes, the new data would become available to other processes.

Another aspect of a "transaction" is that the one process can throw away its changes and revert to the prior version of its data.

Previous attempts at building transaction processing by the operating system has lead to implementation issues as memory management becomes too slow and impractical at As more developers become comfortable with "threading" and multi-process applications, a developer may request from the operating system a "transacted" Process ID.

Pre-Process Operating System Requirements

Each process needing transacted memory requests the creation by the operating system of a "transacted" Process ID.

The operating system may generate a Process ID with the attribute flags enabled for memory access (transaction or security) enabled. A Process ID may be a 64 bit value such as: 0x2001 0000 0000 1234.

The CPU security and transactional flags may be maintained in the last nibble. The remaining Process ID's are for the operating system and virtual machines such as: OxT-VVV XXXX XXXX SSSS, Where: T="transactional/security flags"; V="virtual machine identifier"; X="operating system and user Process ID"; S="operating system and user process thread ID".

When the operating system builds a thread context, it may provide a data access mask to the process which may be stored with the process context. This may be managed by the HPCS. See the Security section regarding security bits and access masks.

In additional, the Virtual Memory Map associative arrays maintained by the operating system may have an additional associative array element which includes the Process ID that allocated the memory block.

When the CPU issues a "page fault" and needs to swap in the memory block map into the CPU's virtual to physical memory map, the Process ID may be part of the information within the memory allocation block inserted into the CPU context registers for virtual memory mapping.

The associative array may be implemented, for example, as follows (the addresses are illustrative only):

| Block | Virtual Address | Physical Address | Process ID |
|-------|-----------------|------------------|------------|
| 1     | 0x0000 0000 0000 | 0x2803 0000 0000 | 0x0001 0000 0000 |
| 2     | 0x2000 0000 0000 | 0x2804 0000 0000 | 0x1001 0000 0000 |
| 3     | 0x4000 0000 0000 | 0x78BD 0000 0000 | 0x2001 0000 0000 |
| 4     | 0x5000 0000 0000 | 0xF932 0000 0000 | 0x3001 0000 0000 |

These virtual/physical memory maps are typically kept in n-way associative arrays (typically 4-way) within the operating system and CPU context maps.

Memory map as discussed herein include the Process ID that allocated the virtual memory block. The Process IDs illustrate an example of the high nibble such that the high nibble is:

0x0—No security
0x1—Security—Access only by this Process ID
0x2—Transacted—The Process ID is transacted
0x3—Secure/Transacted—The Process ID is secured and transacted Once the operating system has created proper Process IDs and virtual memory allocation maps, the transactional core can be enabled.

Features consistent with some embodiments of the present disclosure provide for four computing architecture configurations.

The Transactional Core: A redundant memory core for use with transactional processes. This core is a duplicate of all memory in Main Memory.

The CPU chipsets may write to two memory buses simultaneously.

Memory Access: Each memory block may be flagged within the processor's memory page associative array cache that identifies the page block access level as read/write, read-only, or transacted.

Transaction Save/Commit/Rollback. As each process complete or transaction completes, the CPU may be instructed to "copy" the memory page between Transactional Core and Main Memory.

Transactional Core

According to principles consistent with some embodiments of the present disclosure, a redundant memory core called the "transaction core" is provided that may run in parallel with the main memory core. This is a simple construction of the memory bus and memory access chipsets to access conditionally two memory cores simultaneously. These memory cores share the exact same linear address space allowing for simultaneous write. In some embodiments consistent with the principles of some embodiments of the present disclosure, the management responsibility may be shifted from the operating system to the CPU core, e.g., the context controller.

This core configuration shows that the CPU may control the bus with a tri-state access wire on the chipset that affects the bus controller once ALE (address latch enable) is settled. The states may be:

Off (Tri-State)—The Access Switch is neither high nor low. This means that no data may be transferred during the access cycle High—Access Switch is off. During the Write Cycle, both Core Buses are active allowing the write to occur on both cores. During the Read Cycle, only the Main Core is active Low—Access Switch is on. During the Write AND Read Cycle, only the Transaction Core is active.

It may be appreciated that this processing is completely transparent to the operating system and the CPU. Therefore, this process of providing duplicate memory has no effect of process throughput.

Writing to Memory and Reading from Memory

During the read/write cycle by a Process ID, the CPU may access physical memory space using the virtual memory map provided by the operating system.

The writing process requires that the CPU activate the Tri-State Access Switch appropriately. It may do so by comparing the Process ID of the executing context and the Process ID of the virtual memory map which may set the Tri-State flag appropriately.

First it may compare the Context Process ID and the Virtual memory map which may be done automatically by CPU registers loading the process context and virtual memory map. This is a function of the CPU registers and no instruction is needed to execute the condition:

Assume Context Process ID A and Virtual Memory Process ID B.

Bits are number 0 to 63. Bit 60 is security bit. Bit 61 is transaction bit.

CPU Registers Compare A to B (lower 60 bits, bits 0 through 59). Resulting in the A=B signal.

Figure 6:
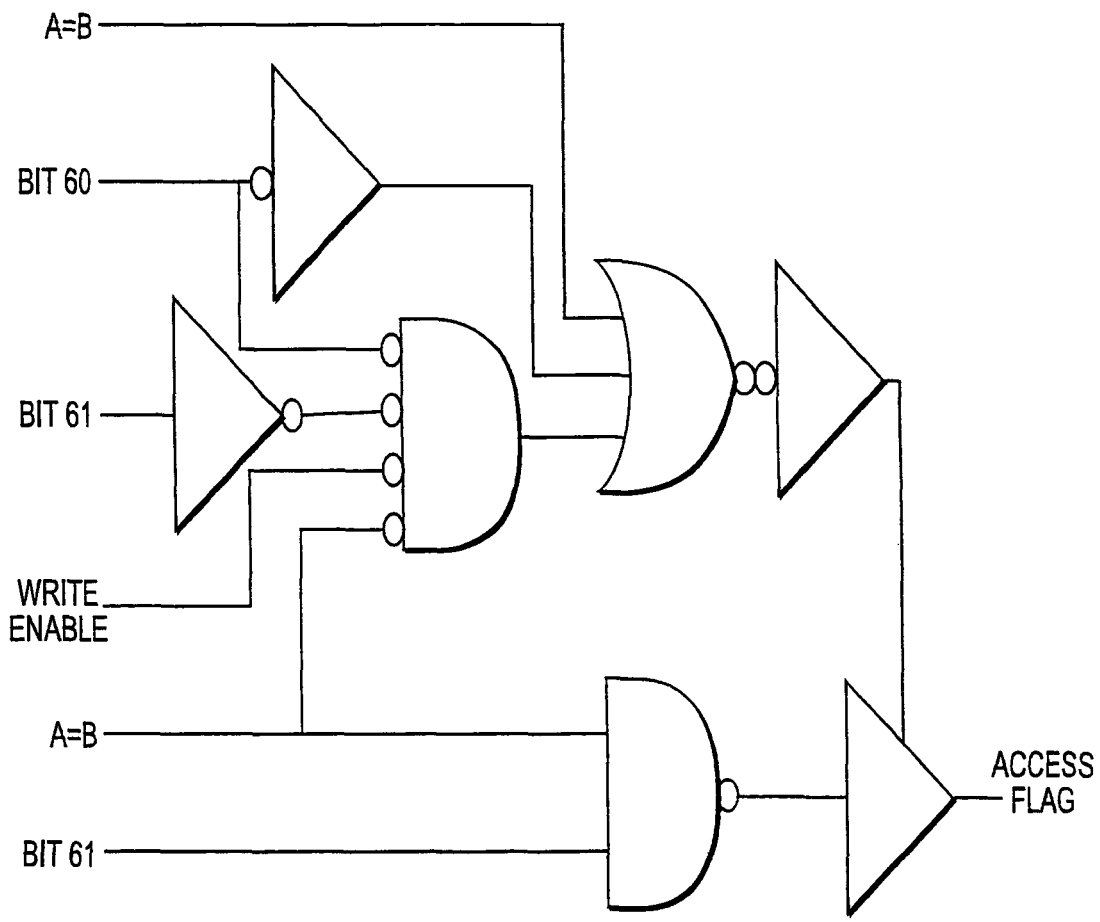
FIG. 6 depicts an example logic diagram, in accordance with some embodiments of the present disclosure.

The resulting Access Flag is illustrated by the logic circuit as depicted in FIG. 6.

Transaction Flag (Bit 61) turns on the Transaction Core or Main Core memory flag. Security Flag (Bit 60) enables the Tri-state buffer determining if access is granted for the Process ID.

The Security flag is complex. In a transaction, if the accessing process is not process B and a read process occurs on process B's memory block, it may do so from main memory and if it tries to write, it may be blocked from the write as a write would attempt to write to both memory planes as dictated by the access flag being low.

The Security rules are:

If A=B, then the Access Flag is enabled (0 or 1), OR

If Bit 60 is off, then the Access Flag is enabled (0 or 1), OR

If Bit 60 is off AND Bit 61 is on (it's a transaction) AND it's not a write cycle AND A< >B, then the Access Flag is enabled (0 or 1)

The Access Flag is handled such that:

If Bit 61 is on AND A=B, then set to 0 for Read/Write occurs from Transaction Core If Bit 61 is on AND A< >B, then set to 1 so that Reads occur from Main Core and Write occurs in both cores.

If Tri-State (based on security flag), memory may not be passed along the memory bus by the memory controller. This security rule is illustrated by the logic diagram in FIG. 6

In a transaction, Process A (if not equal to B) cannot be allowed to write to Process B's transacted memory. Therefore, the access flag is turned off and the memory buss controller may not perform the write.

For reads, if the access flag is in tri-state, memory values returned by the memory controller may be all zeros (0's) or ones (1's) or Tri-State preventing a successful read.

Context Transaction Save/Commit/Rollback

During process execution, memory modifications are only done on transaction memory if Bit 61 is on in the Virtual Memory Map Process ID.

Once the process is terminated by the operating system (or any time by the process itself) the operating system may submit a Process Context Commit instruction to the CPU.

The CPU may take the Process Context Commit instruction and output the virtual memory block/physical memory block information to the Memory Controller.

The Memory Controller may copy the memory block from the Transactional Core directly to the Main Memory Core (or in the case of a rollback from the Main Memory Core to the Transactional Core). This copy is to be done outside the CPU through DMA controllers (or parallel bus controllers) managed by the Memory Bus Controller.

The direction of the copy is extremely important. There may be one instruction for a "save" copy instruction to the memory bus and a "rollback" instruction for a copy in the reverse direction. This allows a transaction to abandon all changes and "rollback" to the previous copy of the memory block.

In this solution, the Commit is a single instruction and all memory movement occurs in hardware.

Usage of the Core

The process for executing a transaction by application processes may be simple. The steps to perform a transaction with the described architecture are as follows.

Operating System Generates Process ID with Transaction Flag. The Operating System Creates a Process Context for the Thread. The Process Context is transferred to the CPU for thread execution and Virtual Memory Maps are swapped into activation (exactly as maps and contexts are executed in current architectures). Application or Thread Read/Writes to memory as it normally does. Each memory block allocation is associated with the Process ID in the virtual memory map maintained by the operating system. Application or Thread Terminates. The Operating System issues a Process Termination to the CPU to remove the context and issue a transaction commit instruction (or transaction rollback instruction) for the Process ID which instructs the CPU to instruct the memory bus to copy each virtual memory block for the Process ID between the transactional memory core and the main memory core. Operating system releases the virtual/physical memory blocks for the Process ID to other processes.

It may be noted that the memory blocks allocated within the process are part of the same transaction. Only when the process is complete is memory copied to Main Core. The transaction is the life span of a process/thread execution.

It may be appreciated that the methods, apparatus, configurations, architectures, etc., discussed herein may be applied to different industries. For example: 1) Film Industry. Animation Rendering in Multi-Process Film Rendering on Shared Systems; 2) Gaming Industry. Real Time Parallel multi-processing scene rendering on Shared Systems; 3) Education/Research. Real Time Parallel multi-equation processing on Shared Systems; 4) Finance. Real Time market estimation and statistical processing on Shared Systems; 5) Science. Parallel Data Processing on Shared Systems; 6) Computing. Virtualization Hypervisors no longer need to keep track of available CPU's, simply provide Virtual Server process prioritization queues, etc.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
a system memory comprising a main memory core and a transaction memory core, wherein the transaction memory core is configured to store a duplicate of information stored in the main memory core, and wherein the main memory core is configured to at least store a context definition map that defines context switch information to run processes;
a memory bus controller coupled in parallel to the main memory core and the transaction memory core;
a plurality of cores configured on a single die, wherein each of the plurality of cores is configured to execute a respective one of a plurality of processes, wherein each of the plurality of cores is associated with respective first and second level caches, and wherein the plurality of cores is associated with a shared third level cache, the shared third level cache coupled to the memory bus controller;
a context cache memory located on the single die, wherein the context cache memory is configured to store context switch information for at least a subset of the plurality of processes, and wherein the context cache memory provides context switch information to the main memory core when the context cache memory is full; and
a context switch controller circuit located on the single die and directly coupled to the context cache memory and further directly coupled to the plurality of cores via a dedicated bus, the context switch controller circuit configured to control execution of respective ones of the plurality of processes by a respective one of the plurality of cores through direct interaction with each core of the plurality of cores over the dedicated bus;
wherein, before one of the plurality of cores is available to execute a next process of the plurality of processes, and wherein each of the plurality of processes has an associated priority as provided by an operating system, the context switch controller circuit is configured to:
determine the next process to execute from the plurality of processes;
determine whether context switch information for the next process is stored in the context cache memory;

based on the context switch information for the next process being stored in the context cache memory, provide the context switch information for the next process to one of the plurality of cores, wherein the context information for the next process was determined to be stored in the context cache memory through a determination that a process identifier (ID) associated with the next process is stored in the context cache memory;

generate an interrupt in response to a determination that the context switch information for the next process is not stored in the context cache memory, wherein the context information for the next process was determined to not be stored in the context cache memory through a determination that the process ID associated with the next process is not stored in the context cache memory;

receive an identifier of a memory block at the system memory, which is not located on the single die, the memory block comprising the context switch information for the next process, and wherein the memory block is located in both the main memory core and the transaction memory core;

determine whether the next process is secure, transacted, or both secure and transacted based on two bits of the process ID, wherein a transacted process includes a process that allows one process to update and change data associated with the next process while one or more other processes read from a prior version of that data, and wherein the prior version of that data is read from the main memory core and the updated or changed data is stored in the transaction memory core;

determine whether a tag associated with the memory block comprises the process ID associated with the next process and an access mask associated with the next process, wherein the access mask is associated with the next process when the next process is either secured or both secured and transacted; and based on the tag associated with the memory block comprising the process ID associated with the next process and the access mask associated with the next process, access the context switch information for the next process at the memory block at the system memory not located on the single die and provide the context switch information for the next process to one of the plurality of cores.

2. The system of claim 1, wherein the context cache memory located on the single die is configured to store identifiers of each of the plurality of processes and a status of each of the plurality of processes.

3. The system of claim 1, wherein the process ID includes one of a thread ID or a virtual machine ID.

4. The system of claim 1, wherein the context switch controller circuit is further configured to receive a context map location for the next process.

5. The system of claim 1, wherein the context switch controller circuit is configured to receive the identifier of the memory block at the system memory not located on the single die in response to the interrupt, wherein the memory block comprises a register set.

6. The system of claim 5, wherein the context switch controller circuit is further configured to cache the register set at the context cache memory located on the single die in response to receipt of the identifier of the memory block at the system memory not located on the single die.

7. A method, comprising:

tagging a memory block with a process identifier and an access mask, wherein an operating system generates the process identifier and the access mask, and wherein the access mask is associated with multiple processes;

receiving, at a context switch controller configured on a central processing unit configured on a single die comprising a plurality of cores, a command to execute a process of a plurality of processes on the central processing unit, wherein each of the plurality of processes has an associated process identifier and an associated access mask; and before any of the plurality of cores is available to execute the process:
  determining whether context switch information for the process is stored in a context cache memory located on the single die;
  based on the context information for the process not being stored in the context cache memory located on the single die, generating an interrupt;
  receiving, at the context switch controller, an identifier of a memory block at a system memory not located on the single die, the memory block comprising the context switch information;
  determining whether a tag associated with the memory block comprises the process identifier associated with the process and the access mask associated with the process;
  based on the tag associated with the memory block being determined to not comprise the process identifier associated with the process and the access mask associated with the process, receiving all ones;
  based on the tag associated with the memory block being determined to comprise the process identifier associated with the process and the access mask associated with the process, accessing the context switch information for the process at the memory block at the system memory not located on the single die; and
  scheduling the process to execute on one of the plurality of cores;

while executing the process on one of the plurality of cores, accessing a different memory block that was tagged with a different process identifier but same access mask; and based on the process and the different memory block being associated with the same access mask, allowing the process to read data from the different memory block but prohibiting the process to write data to the different memory block.

8. The method of claim 7, wherein:
the memory block comprises a register set, and
receiving the identifier of the memory block at the system memory not located on the single die comprises receiving the identifier in response to the interrupt.

9. The method of claim 8, further comprising:
caching the register set at the central processing unit in response to receiving the identifier of the memory block at the system memory not located on the single die.

10. The method of claim 7, wherein the process identifier associated with the process includes one of a thread ID or a virtual machine ID.

11. The method of claim 7, further comprising receiving a context map location for the process.

12. A non-transitory computer-readable medium comprising computer-executable instructions that, in response to execution by a computer, cause the computer to:
- identify, at a context switch controller, a process of a plurality of processes to execute on a central processing unit located on a single die comprising a plurality of cores, based on a command to execute the process, the command received from an operating system;
- determine that context switch information for the process is not stored in a context cache memory located on the single die and, in response, generate an interrupt;
- detect, at the context switch controller, an identifier of a memory block at a system memory not located on the single die, the memory block comprising the context switch information;
- determine that a tag associated with the memory block comprises a process identifier (ID) associated with the process and an access mask associated with the process;
- access, by the context switch controller, the context switch information for the process at the system memory not located on the single die; and
- schedule, by the context switch controller, the process to execute on one of the plurality of cores based on priority queuing provided by the operating system, wherein the context switch controller determines which of the plurality of cores is available to execute the process.

13. The non-transitory computer-readable medium of claim 12, wherein the instructions, which in response to execution by the computer, cause the computer to determine that the context switch information for the process is not stored in the context cache memory located on the single die include instructions that cause the computer to determine that the process ID is not stored in the context cache memory located on the single die.

14. The non-transitory computer-readable medium of claim 12, wherein the process ID includes one of a thread ID or a virtual machine ID.

15. The non-transitory computer-readable medium of claim 12, wherein the instructions, in response to execution by the computer, further cause the computer to:
- determine a register set at the system memory not located on the single die in response to the interrupt.

16. The non-transitory computer-readable medium of claim 15, wherein the instructions, in response to execution by the computer, further cause the computer to:
- cache the register set at the central processing unit in response to determination of the register set at the system memory not located on the single die.

* * * * *

UNITED STATES PATENT AND TRADEMARK OFFICE
CERTIFICATE OF CORRECTION

PATENT NO. : 9,658,877 B2
APPLICATION NO. : 13/003222
DATED : May 23, 2017
INVENTOR(S) : Barwick It is certified that error appears in the above-identified patent and that said Letters Patent is hereby corrected as shown below:

In the Specification

In Column 1, Line 9, delete "Application No." and insert -- Application Ser. No. --, therefor.

In Column 1, Line 10, delete "filed Aug. 23, 2010," and insert -- filed on Aug. 23, 2010, --, therefor.

In Column 2, Line 58, delete "inter alfa," and insert -- inter alia, --, therefor.

In Column 5, Lines 4-5, delete "Multi Processing (SMP)" and insert -- Multi-Processing (SMP) --, therefor.

In Column 5, Line 19, delete "(return form interrupt)" and insert -- (return from interrupt) --, therefor.

In Column 7, Line 54, delete "context controller 102," and insert -- context controller 104, --, therefor.

In Column 8, Lines 51-52, delete "I/O controller. (memory controller)" and insert -- I/O controller (memory controller) --, therefor.

In Column 9, Line 66, delete "has lead to" and insert -- has led to --, therefor.

In Column 11, Line 31, delete "transacted" and insert -- transacted. --, therefor.

In Column 12, Line 51, delete "(0 or 1)" and insert -- (0 or 1). --, therefor.

In Column 12, Lines 59-60, delete "FIG. 6" and insert -- FIG. 6. --, therefor

In Column 14, Line 38, delete "and or" and insert -- and/or --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,658,877 B2

In the Claims

In Column 17, Line 5, in Claim 1, delete "context information" and insert -- context switch information --, therefor.

In Column 18, Line 19, in Claim 7, delete "context information" and insert -- context switch information --, therefor.